INVENTORS
LELAND B. SMITH
BARRET B. WEEKES
BY FOWLER, KNOBBE
& GAMBRELL
ATTORNEYS

INVENTORS
LELAND B. SMITH
BARRET B. WEEKES
BY FOWLER, KNOBBE
& GAMBRELL
ATTORNEYS

United States Patent Office 3,304,507
Patented Feb. 14, 1967

3,304,507

SAMPLE AND HOLD SYSTEM HAVING AN OVER-ALL POTENTIOMETRIC CONFIGURATION

Barret B. Weekes and Leland B. Smith, Fullerton, Calif., assignors to Beckman Instruments, Inc., a corporation of California Filed Feb. 7, 1964, Ser. No. 343,416
9 Claims. (Cl. 328—151)

The present invention relates to sample and hold systems, and more particularly, to a sample and hold system having an overall potentiometric configuration whereby the system input impedance is extremely high.

Sample and hold systems presently find extensive application in the electronics art. A specific field of use is in electronic sampled data systems wherein the amplitude of the input signal is sampled very accurately in the sample mode after which the sampled value is held or stored when the hold mode is initiated. In this manner, the time at which a given signal is sampled can be determined very precisely.

Sample and hold systems presently in use generally employ a capacitive storage element in combination with an amplifier. The capacitor is charged to a value proportional to the input signal during the sample period and the amplifier input disconnected from the input data when the hold mode is initiated. The voltage stored in the capacitor is then maintained so long as current leakage from the capacitor is minimized. However, in an operational amplifier, there is always a small amount of input current flow. Thus, the grid current of a vacuum tube amplifier is of the order of 10 picoamperes and is substantially higher in transistor amplifiers wherein even a low current ejection differential amplifier has an input current flow of the order of 100 nanoamperes. The voltage across the capacitor will thus decrease or droop with time and provide only a short time hold interval. Attempts to lengthen the hold time by increasing the capacitance value deleteriously affects the ability of the system to quickly store the sample signal. Thus, the RC time constant delays the appearance of the input signal at the output of the amplifier. For example, the appearance on the amplifier output of the input signal to within 0.005% of final value is delayed by 10 RC. It will be apparent that an increase of the capacitive value will proportionately lengthen the time interval necessary for storing the sampled input signal.

Heretofore, sample and hold systems have been constructed having an overall operational configuration so that the RC network is isolated from the signal being sampled so that the RC network is driven from a low impedance amplifier. An exemplary embodiment of this type of sample and hold system is disclosed in the copending application Serial No. 343,407 entitled "Sample and Hold System" of Barret B. Weekes, filed on even date herewith and assigned to Beckman Instruments, Inc., assignee of the present invention. Frequently, however, the input data must be connected to an extremely high source impedance which has heretofore inserted a buffer amplifier between the data and the sample and hold system.

It is an object of this invention to provide an improved sample and hold system which substantially unloads the input signal source and provides an extremely high input impedance, e.g. several hundred megohms and an independent feedback path around the input stage at high frequencies for insuring over-all loop stability in the sample mode.

Another object of the present invention is to provide a sample and hold system having an extremely minimal sampling time and providing a new hold voltage after the previous one has been encoded as soon as a high speed switch is actuated.

A further object of the present invention is to provide a sample and hold system which inherently rejects common mode voltages.

In brief, a preferred embodiment of this invention comprises a first amplifier, a switching means, an RC network and a second amplifier. The first amplifier received its feedback from a voltage divider network connected across the output of the second amplifier to provide an over-all potentiometric feedback and has a capacitor connected between its output signal terminal and its input feedback terminal to provide an independent feedback path at high frequencies for insuring over-all loop stability in the sample mode. The sample and hold system is then connected in an overall potentiometric configuration during the sample mode which unloads the source, permits accurate amplification of the input signal, and allows the storage of a voltage on the memory capacitor that is an accurate replica of the input signal at a given instant in time.

In addition, sample and hold systems are described in detail hereinafter which provide either substantially zero sampling time or common mode rejection or both.

A more thorough understanding of the invention may be obtained by a study of the following detailed description taken in connection with the accompanying drawings wherein.

Figure 1:
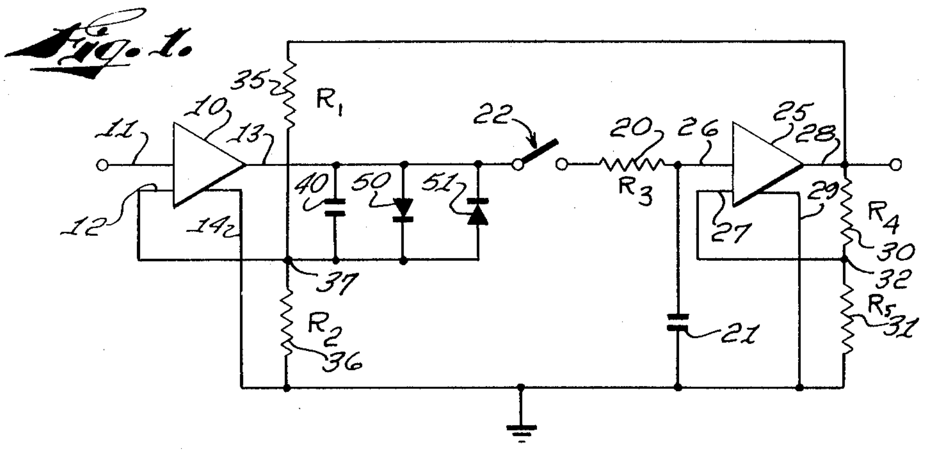
FIG. 1 is a schematic circuit of a sample and hold system having an overall potentiometric configuration in accordance with this invention.

Referring now to FIG. 1, the first amplifier stage advantageously comprises a low drift differential amplifier having first and second input terminals 11, 12 floating with respect to ground and signal output terminal 13 and grounded output terminal 14. Output terminal 13 is selectively connected to an RC circuit comprising series resistance 20 and parallel capacitance 21 by single pole, single throw switch 22.

A second amplifier stage advantageously comprises a low drift differential amplifier having first and second input terminals 26, 27 floating with respect to ground and signal output terminal 28 and grounded output terminal 29. This amplifier is provided with voltage feedback of the potentiometric type by resistive impedances 30 ($R_4$) and 31 ($R_5$) serially connected between the output terminals 28, 29. Node 32 common to these resistive impedances is connected to the input terminal 27 so that the voltage across impedance $R_5$ is connected in series with the capacitor 21 and the amplifier input terminals 26, 27. This potentiometric configuration provides a high input impedance for isolating the voltage stored on the capacitor 21 from loading effects when the switch 22 is opened to provide the hold mode.

Overall system feedback is provided by resistive impedances 35 ($R_1$) and 36 ($R_2$) serially connected between the output terminal 28 and common system ground. Node 37 common to these resistive impedances is connected to the input terminal 12 so that the voltage across impedance $R_2$ is connected in series with the amplifier input terminals 11, 12, thereby providing an overall potentiometric configuration.

Capacitor 40 is connected between the output signal terminal 13 and the input terminal 12 of the first amplifier stage and provides an independent feedback path at high signal frequencies for insuring overall loop stability in the sample mode. Thus, at high frequencies in the sample mode, each amplifier need only be stable by itself so as to substantially improve the overall loop stability.

The first amplifier stage also includes means which change the gain of this stage from open loop to essentially unity if the input signal times the gain of the stage is greater than a predetermined value. As shown in FIG. 1, oppositely poled, parallel connected diodes 50, 51 are connected between the output terminal 13 and the input terminal 12. These diodes present a high impedance except when the voltage drop across the output terminals 13, 14 minus the voltage drop across $R_2$ exceeds the forward bias breakdown voltage of these diodes. This structure is disclosed and claimed in the copending application of Barret B. Weekes entitled "Sample and Hold System," supra.

The operation of the sample and hold system of FIG. 1 is as follows: Prior to the sample mode, the first amplifier follows the system input signal (to within one diode forward bias drop) since diodes 50, 51 will have been conducting because of the lack of any other feedback path for this amplifier stage. At the initiation of the sample mode, switch 22 is closed and capacitor 21 is charged through resistor $R_3$. The capacitor voltage is then amplified by the output amplifier 25 which has a gain of $R_4+R_5/R_5$. The amplified capacitor voltage is then fed back through the voltage dividers $R_1$ and $R_2$ to the input. When the sample and hold output voltage times $R_2/R_1+R_2$ equals the input signal; the capacitor is fully charged and accurately represents the input signal. At this time or any later time, switch 22 may be opened to initiate the hold mode.

In the hold mode, the switch 22 is opened which in turn opens the feedback loop. The capacitor voltage will then remain constant except for the small current flow into or out of the second stage amplifier 25. More particularly, in the hold mode, the capacitor voltage will droop at the rate of $$\frac{de}{dt}=\frac{i}{C}\text{ volts/second} \tag{1}$$

where $i$ is the current flow into or out of the front end of the amplifier 25.

In order to prevent the diodes 50, 51 from conducting when the system has settled out in the sample mode, the closed loop gain $R_4+R_5/R_5$ of the second amplifier stage is made equal to the system overall gain. This will keep the voltage across the diodes at zero and hence offer a very high resistance that is a negligible shunt load on the $R_1$, $R_2$ voltage divider. Thus, for the diode voltage to be zero $$E_1-E_0\left(\frac{R_2}{R_1+R_2}\right)=0 \tag{2}$$

or $$E_1=E_0\left(\frac{R_2}{R_1+R_2}\right) \tag{3}$$

where $E_1$ is the voltage between output terminals 13, 14 of the first amplifier and since $(R_1+R_2/R_2)$ is the overall system gain $(G_{oa})$, Equation 3 may be rewritten as $$E_1G_{oa}=E_0 \tag{4}$$

Also, $$E_1G_2=E_0 \tag{5}$$

where $G_2$ is the closed loop gain of the second amplifier stage. In order for both Equations 4 and 5 to be true, $$G_{oa}=G_2 \tag{6}$$

or $$\frac{R_1+R_2}{R_2}=\frac{R_4+R_5}{R_5} \tag{7}$$

Figure 2:
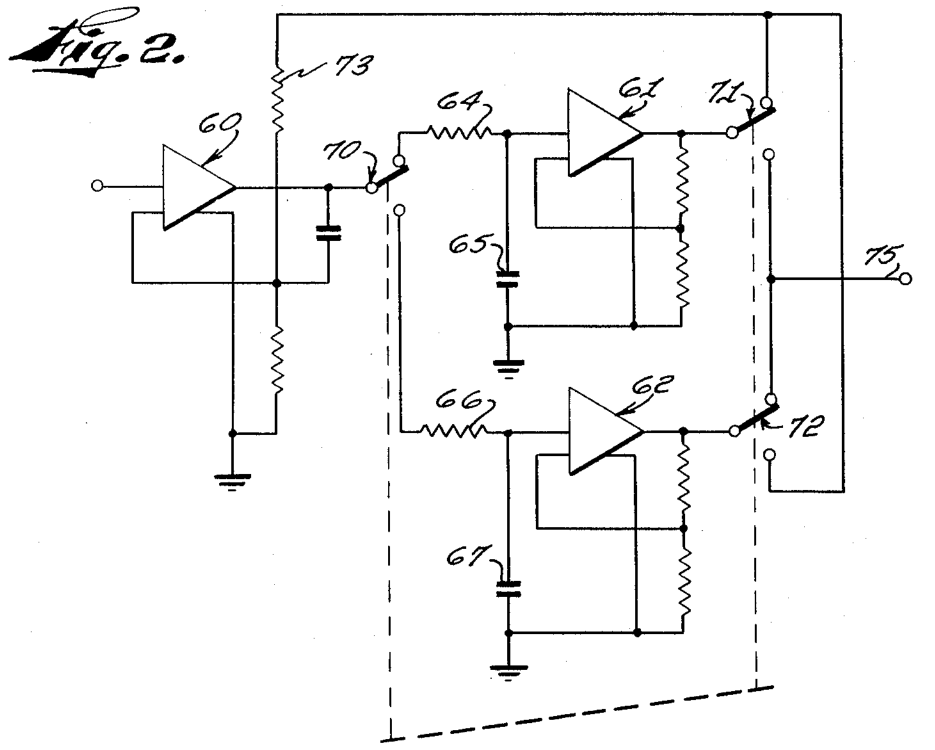
FIG. 2 is a schematic of a sample and hold system with substantially zero sampling time.

The present invention further contemplates a sample and hold system with zero sampling time. Referring now to FIG. 2, this system includes a first input stage 60 and a pair of second amplifier stages 61, 62 respectively connected to RC networks comprising resistor 64, capacitor 65 and resistor 66, capacitor 67. The output of the first amplifier stage is selectively connected to either one or the other of these RC networks by single pole, double throw switch 70. Likewise, single pole, double switches 71, 72 selectively connect the output of the second amplifier stage 61 or amplifier stage 62 to the potentiometric feedback impedance 73 of the first amplifier stage. Switches 70, 71 and 72 are advantageously driven by a common driver such as a single flip-flop control (not shown). Each of the first and second amplifier stages may be constructed in a manner identical to the sample and hold system of FIG. 1 or may include alternate circuitry, as for example, the sample and hold circuitry disclosed in the copending application entitled "Sample and Hold System" of Barret B. Weekes, supra.

The operation of the system of FIG. 2 is as follows: At any given time, one of the amplifiers is in its hold mode while the other is in its sample mode. For example, in the system shown, the input signal applied to the amplifier 60 is charging capacitor 65, i.e. the upper stage is in its sample mode whereas the voltage on capacitor 67 is being held for readout on output terminal 75 via amplifier 62. Upon actuation of switches 70, 71 and 72, the voltage stored in capacitor 65 is read out and capacitor 67 recharged to a new sample voltage. Thus, the holding time of one output amplifier is the sampling time for the other so that the sampling time is reduced to zero so far as the output terminal 75 is concerned. The availability of a new hold voltage after the previous one has been encoded is limited only by the transition time of switches 70, 71 and 72.

Figure 3:
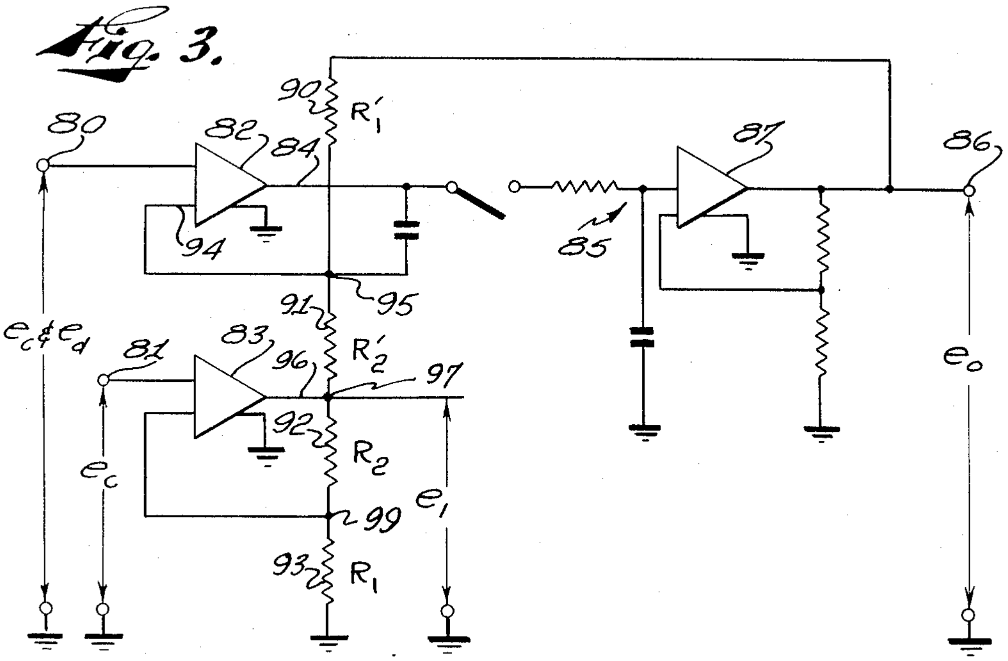
FIG. 3 is a schematic of a sample and hold system having common mode rejection.

Referring now to FIG. 3, a sample and hold system is shown which provides high common mode rejection. As shown, the system input terminals 80, 81 are connected to inputs of respective first amplifier stages 82, 83. The floating output terminal 84 of amplifier stage 82 is selectively connected, as in the foregoing embodiments, to an RC network 85. This network is isolated from the system output terminal 86 by a second amplifier stage 87 in the manner described hereinabove.

Four resistive impedances 90, 91, 92 and 93 are connected between the output terminal 86 and system ground with the input terminal 94 of amplifier 82 connected to the common node 95 of impedances 90, 91; the floating output terminal 96 of amplifier 83 connected to the common node 97 of impedances 91, 92; and the input terminal 98 of amplifier 83 connected to the common node 99 of impedances 92, 93.

The following equations can be written to demonstrate the common mode rejection:

$$e_1=\frac{R_1+R_2}{R_1}e_c \tag{8}$$

where $e_c$ is the common mode voltage and $e_1$ is the output voltage of the potentiometric connected amplifier 83.

Because of the extremely high input impedance of potentiometric connected amplifier 82, virtually no current flows through the feedback mesh of this amplifier; therefore, the summation of currents at node 95 may be assumed to be zero, or $$\frac{e_0-(e_c+e_d)}{R_1'}-\frac{e_c+e_d-e_1}{R_2'}=0 \tag{9}$$

where $e_d$ is the difference input signal voltage between terminals 80 and 81, or $$R_2'e_0-R_2'e_c-R_2'e_d-R_1'e_c-R_1'e_d+R_1'e_1=0 \tag{10}$$

If $R_1=R_1'$ and $R_2=R_2'$, Equation 8 can be substituted into Equation 10 to obtain $$R_2e_0-R_2e_c-R_2e_d-R_1e_c-R_1e_d+R_1e_c+R_2e_c=0 \tag{11}$$

or $$R_2e_0=(R_1+R_2)e_d$$

Thus, the ratio of the output to the input voltage is given by the equation $$e_0/e_d=R_1+R_2/R_2 \quad (12)$$

with no common mode voltage.

Figure 4:
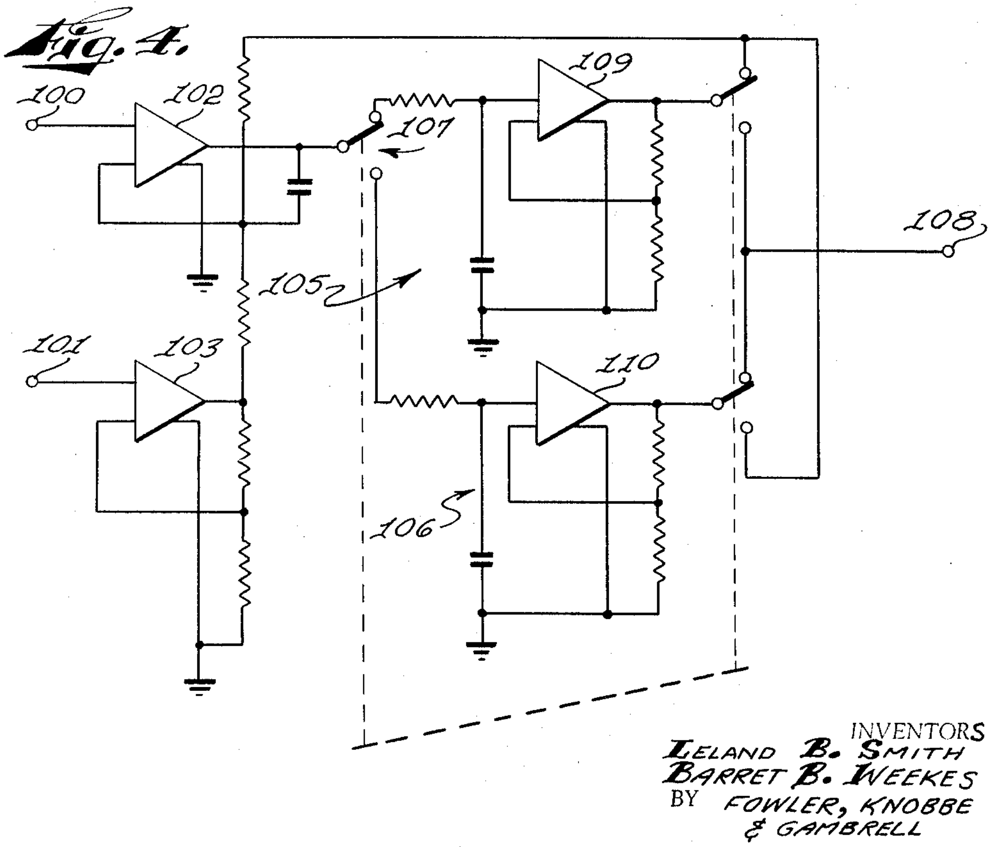
FIG. 4 is a schematic of a sample and hold system having both zero sampling time and common mode rejection.

A sample and hold system incorporating both zero sampling time and common mode rejection is shown in FIG. 4. As in the system of FIG. 3, the system input terminals 100, 101 constitute respective input terminals of a first amplifier 102 and another first amplifier 103. The output of amplifier 102 is selectively connected to RC network 105 or RC network 106 by single pole, double throw switch 107 in the manner of the system of FIG. 2 so that one capacitor is being charged to provide a sample mode while the voltage on the other capacitor is being held to provide a hold mode. Thus, the signal supplied the output terminal 108 via respective isolation amplifiers 109, 110 is supplied with zero sampling time and is devoid of any common mode voltage component.

The amplifier stages hereinabove described are advantageously constructed according to the teachings of the copending application of Leland B. Smith et al. Serial No. 338,362 filed January 17, 1964, entitled "Temperature Compensated Transistor Amplifiers," assigned to Beckman Instruments, Inc., assignee of the present invention. This application teaches and claims improved transistor amplifier circuitry which compensates for the effects of base current variations due to temperature variations in the base current gain parameter and the effects of mismatched thermocoefficients of the base-emitter voltage parameter $V_{be}$. These amplifiers are thus very low drift amplifiers and have a very low front end current ejection, the latter being a particular advantage in the isolation amplifier stage since the leakage rate of the capacitor is substantially dependent upon the input current flow of the second stage during the hold interval.

Although exemplary embodiments of the invention have been disclosed and discussed, it will be understood that other applications of the invention are possible and that the embodiment disclosed may be subjected to various changes, modifications and substitutions without necessarily departing from the spirit of the invention.

We claim:

1. A system for selectively sampling and holding an input signal having an overall potentiometric configuration during the sample mode, said system including
   - a first amplifier having signal and feedback input terminals floating with respect to ground and signal and grounded output terminals,
   - an RC network comprising a series resistive impedance and parallel capacitive impedance,
   - a second amplifier having signal and feedback input terminals floating with respect to ground and signal and grounded output terminals,
   - means connecting said capacitive impedance between said signal input terminal of said second amplifier and ground,
   - means for selectively interconnecting said signal output terminal of said first amplifier through said series resistive impedance to said signal input terminal of said second amplifier to charge said capactive impedance to a voltage proportional to said input signal during the hold mode,
   - means coupled to said second amplifier for providing potentiometric feedback comprising
     - first and second impedances serially connected between the output terminals of said second amplifier and
     - means connecting the node common to both said impedances to said feedback input terminal of said second amplifier,
   - means for providing overall potentiometric feedback during the sample mode comprising
     - third and fourth impedances serially connected between the output terminals of said second amplifier and
     - means connecting the node common to both impedances to said feedback input terminal of said first amplifier, and
   - a capacitive impedance connected between said signal output terminal of said first amplifier and said feedback input terminal of said first amplifier for providing an independent feedback path at high signal frequencies for insuring overall loop stability in the sample mode.

2. A system for selectively sampling and holding an input signal and having zero sampling time comprising
   - first and second RC networks,
   - first amplifier means,
   - means for selectively connecting said first amplifier means to said first and second RC networks for selectively charging the capacitive impedance of either said first or said second RC network to a voltage proportional to said input signal,
   - second and third amplifier means for respectively isolating said capacitive impedances from loading effects during the hold mode,
   - means for selectively connecting the output of either of said second and third amplifiers to the input of said first amplifier stage so that one of said RC networks and its associated amplifier is in its hold mode while the other is in its sample mode.

3. A sample and hold system having zero sampling time comprising
   - a first amplifier stage coupled to the system input signal,
   - first and second memory storage elements,
   - first and second isollation amplifiers respectively coupled to said first and second memory storage elements,
   - means selectively connecting the output of said first amplifier to one or the other of said memory storage elements, and
   - means for selectively feeding back the output of one of said isolation amplifiers to the first amplifier stage while connecting the output of the other isolation means to said output terminal.

4. A sample and hold system having zero sampling time comprising
   - first and second RC networks,
   - potentiometric amplifier means including means for feeding back only a portion of the output to the input, for isolating each of said RC networks from loading effects during the hold mode,
   - switching means for selectively connecting a signal to be sampled to said RC networks for charging the capacitive impedance of one of said RC networks to a voltage proportional to the system input signal so that one of said capacitive impedances is charged during a sample mode while the other of said capacitive impedances simultaneously provides a hold mode.

5. A sample and hold system having zero sampling time comprising
   - a first amplifier having signal and feedback input terminals floating with respect to ground and signal and grounded output terminals,
   - first and second RC networks each comprising a series resistive impedance and parallel capacitive impedance,
   - second and third amplifiers each having signal and feedback input terminals floating with respect to ground and signal and grounded output terminals,
   - means connecting said capacitive impedances respectively between said signal input terminals of said second and third amplifiers and ground,
   - means for selectively interconnecting said signal output terminal of said first amplifier through one or the other of said series resistive impedances to said signal input terminals of said second and third amplifiers respectively to charge its associated capacitive impedance to a voltage proportional to the system input signal during a sample mode, means respectively coupled to said second and third amplifiers for providing potentiometric feedback comprising first and second impedances serially connected between the output terminals of each of said second and third amplifiers and means respectively connecting the node common to said serially connected impedances to said feedback input terminal of the associated amplifiers, and means for providing overall potentiometric feedback comprising third and fourth serially connected impedances, means connecting the node common to said impedances to said feedback input terminal of said first amplifier, and means for selectively connecting said third and fourth impedances between the output terminals of one or the other of said second and third amplifiers so that the output of the amplifier whose associated RC network is being charged will be connected by the feedback network to said first amplifier.

6. A sample and hold system having zero sampling time comprising a first amplifier having signal and feedback input terminals floating with respect to ground and signal and grounded output terminals, first and second RC networks each comprising a series resistive impedance and parallel capacitive impedance, second and third amplifiers each having signal and feedback input terminals floating with respect to ground and signal and grounded output terminals, means connecting said capacitive impedances respectively between said signal input terminals of said second and third amplifiers and ground, means for selectively interconnecting said signal output terminal of said first amplifier through one or the other of said series resistive impedances to said signal input terminals of said second and third amplifiers respectively to charge its associated capacitive impedance to a voltage proportional to the system input signal during a sample mode, means for providing overall potentiometric feedback comprising first and second serially connected impedances, means connecting the node common to said impedances to said feedback input terminal of said first amplifier, and means for selectively connecting said first and second impedances between the output terminals of one or the other of said second and third amplifiers so that the output of the amplifier whose associated RC network is being charged will be connected by the feedback network to said first amplifier.

7. A system for selectively sampling and holding an input signal and having substantially zero common mode voltage, said system including a first amplifier having signal and feedback input terminals floating with respect to ground and signal and grounded output terminals;

a second amplifier having signal and feedback input terminals floating with respect to ground and signal and grounded output terminals;

an RC network comprising a series resistive impedance and parallel capacitive impedance;

a third amplifier having signal and feedback input terminals floating with respect to ground and signal and grounded output terminals;

means connecting said capacitive impedance between said signal input terminal of said third amplifier and ground;

means coupled to said third amplifier for providing potentiometric feedback comprising first and second impedances serially connected between the output terminals of said third amplifier and means connecting the node common to both said first and second impedances to said feedback input terminal of said third amplifier;

means for selectively interconnecting said signal output terminal of said first amplifier through said series resistive impedance to said signal input terminal of said third amplifier to charge said capacitive impedance to a voltage proportional to said input signal during the hold mode;

third, fourth, fifth and sixth serially connected impedances connected between the output terminals of said third amplifier, said third and sixth impedances being equal and said fourth and fifth impedances being equal;

means connecting the node common to said third and fourth impedances to said feedback input terminal of said first amplifier; and means connecting the node common to said fifth and sixth impedances to said feedback input terminal of said second amplifier; means connecting the node common to said fourth and fifth impedances to said signal output terminal of said second amplifier.

8. A system for selectively sampling and holding an input signal and having substantially zero mode voltage, said system including a first amplifier having signal and feedback input terminals floating with respect to ground and signal and grounded output terminals, a second amplifier having signal and feedback input terminals floating with respect to ground and signal and grounded output terminals, an RC network comprising a series resistive impedance and parallel capacitive impedance, a third amplifier having signal and feedback input terminals floating with respect to ground and signal and grounded output terminals, means connecting said capacitive impedance between said signal input terminal of said third amplifier and ground, means for selectively interconnecting said signal output terminal of said first amplifier through said series series resistive impedance to said signal input terminal of said third amplifier to charge said capacitive impedance to a voltage proportional to said input signal during the sample mode, first, second, third and fourth serially connected impedances connected between the output terminals of said third amplifier, said first and fourth impedances being equal and said second and third impedances being equal;

means connecting the node common to said first and second impedances to said feedback input terminal of said first amplifier;

means connecting the node common to said third and fourth impedances to said feedback input terminal of said second amplifier; and means connecting the node common to said second and third impedances to said signal output terminal of said second amplifier.

9. A system for selectively sampling and holding an input signal and having substantially zero sample time and substantially zero common mode voltage, said system including first, second, third and fourth amplifier means each having signal and feedback input terminals and signal and grounded output terminals;

system input terminals comprising said signal input terminals of each of said first and second amplifiers, first and second RC networks each comprising a series resistive impedance and parallel capacitive impedance;

means connecting said capacitive impedances respectively between said signal input terminals of said third and fourth amplifier and ground;

means for selectively connecting said signal output terminal of said first amplifier through one or the other of said series resistive impedances to said signal input terminals of said third and fourth amplifiers respectively, to charge the capacitive impedance thereof to a voltage proportional to the system input signal during a sample mode;

first, second, third and fourth serially connected impedances, said first and fourth impedances being equal and said second and third impedances being equal;

an over-all output terminal;

means for selectively connecting said serially connected impedances between the output terminals of the same of said one or the other of said third and fourth amplifier means during said sample mode and for connecting said signal output terminal of one of said third and fourth amplifiers not connected to said serially connected impedances to said over-all output terminal during said sample mode;

means connecting the node common to said first and second impedances to the feedback input terminal of said first amplifier means;

means connecting the node common to said third and fourth impedances to the feedback input terminal of said second amplifier means; and means connecting the node common to said second and third impedances to said signal output terminal of said second amplifier.

References Cited by the Examiner

UNITED STATES PATENTS

| | | | |
|---|---|---|---|
| 2,950,052 | 8/1960 | Knox | 235—183 X |
| 3,058,068 | 10/1962 | Hinrichs et al. | 330—10 |
| 3,079,086 | 2/1963 | Galli et al. | 235—183 X |
| 3,127,565 | 3/1964 | Williams. | |
| 3,229,212 | 1/1966 | Rogers | 328—151 X |

FOREIGN PATENTS

| | | | |
|---|---|---|---|
| 575,178 | 5/1959 | Canada. | |

ROY LAKE, *Primary Examiner.*

N. KAUFMAN, J. B. MULLINS, *Assistant Examiners.*